US006633520B1

(12) United States Patent
Song

(10) Patent No.: US 6,633,520 B1
(45) Date of Patent: Oct. 14, 2003

(54) METHOD AND APPARATUS FOR SEARCHING IN A DISK DRIVE

(75) Inventor: Hubert Song, Sunnyvale, CA (US)

(73) Assignee: Oak Technology, Inc., Sunnyvale, CA (US)

( * ) Notice: Subject to any disclaimer, the term of this patent is extended or adjusted under 35 U.S.C. 154(b) by 0 days.

(21) Appl. No.: 09/332,538

(22) Filed: Jun. 14, 1999

(51) Int. Cl.$^7$ .................................................. G11B 7/09
(52) U.S. Cl. ................................. 369/44.28; 369/30.13
(58) Field of Search ........................... 369/44.11, 44.28, 369/44.29, 44.34, 44.35, 30.13, 30.15, 47.45, 47.28, 47.36, 53.1, 30.1

(56) References Cited

U.S. PATENT DOCUMENTS

| | | | | |
|---|---|---|---|---|
| 4,866,687 A | * | 9/1989 | Kasai et al. ............. | 369/30.15 |
| 5,101,386 A | * | 3/1992 | Kojima et al. ........... | 369/44.28 |
| 5,220,546 A | | 6/1993 | Fennema .................. | 369/44.35 |
| 5,504,726 A | * | 4/1996 | Semba ..................... | 369/44.28 |
| 5,535,327 A | | 7/1996 | Verinsky et al. ............... | 714/5 |
| 5,581,715 A | | 12/1996 | Verinsky et al. ............... | 714/48 |
| 5,828,637 A | * | 10/1998 | Kim ........................ | 369/44.28 |
| 5,841,739 A | * | 11/1998 | Iida et al. .................. | 369/30.13 |
| 5,870,363 A | | 2/1999 | Sun et al. .................. | 369/47.45 |
| 5,920,528 A | * | 7/1999 | Ohshima et al. .......... | 369/44.29 |
| 6,169,714 B1 | * | 1/2001 | Tanaka et al. ............. | 369/44.28 |
| 6,233,208 B1 | * | 5/2001 | Sasaki ...................... | 369/44.29 |
| 6,246,649 B1 | * | 6/2001 | Ohta et al. ................ | 369/47.28 |

OTHER PUBLICATIONS

"*The Compact Disk Handbook*", 2$^{nd}$ edition, by Ken C. Pohlmann, pp. 86–89 (1992).
"Philips Consumer Electronics–Compact Disk: *Nothing is Impossible*", http://www–us.sv.philips.com/newtech/cd.html, pp. 1–26 (May 12, 1999).

"*COMPACT DISC PICKUP DESIGNS*", by Cho Leung Chan, http://www.ee.washington.edu/conselec/W94/cho/chocd.htm, pp. 1–6 (May 12, 1999).
"*GIF Image 669×459 pixels*", http://www.ee.washington.edu/conselec/W94/cho/cho03.gif, (May 12, 1999).
"OTI–9780: *Preliminary Product Brief*", http://www.oaktech.com/briefs/9780.htm, pp. 1–2 (7/98).
"OTI–9780 Product Brief: *Technical Specifications*", http://www.oaktech.com/briefs/978tech.htm, pp. 1–2 (Mar. 12, 1999).
"OTI–975: *IDE CD Recordable/ReWritable Controller*", http://www.oaktech.com/briefs/975.htm, pp. 1–2 (Mar. 12, 1999).
"*GIF Image*", htt://www.oaktech.com/images/975.gif (Mar. 12, 1999).
"OTI–912: *IDE CD–ROM Controller*", http://www.oaktech.com/briefs/912.htm, pp. 1–2 (3/97).
"*GIF Image*", http://www.oaktech.com/images/912blok.gif, (Mar. 12, 1999).

(List continued on next page.)

Primary Examiner—William Korzuch
Assistant Examiner—Kim-Kwok Chu
(74) Attorney, Agent, or Firm—Pennie & Edmonds LLP

(57) ABSTRACT

A center error signal is used to control the sled during fine search operations. The center error signal is used to synchronize the motion of a tracking actuator and a sled. A head is mounted on a sled in a disk drive. The sled is positioned by a sled motor and the head is positionally mounted on the sled. The head includes a lens that is optically coupled to a photo-sensor on the head. A tracking actuator positions the lens with respect to a track on the disk. A center error signal indicates a position of the lens with respect to a track on a disk. A tracks-to-jump signal specifies a predetermined number of tracks on the disk that the sled motor is to move. A modified tracks-to-jump signal is produced in response to the center error signal. The sled motor is controlled with the modified tracks-to-jump signal.

20 Claims, 4 Drawing Sheets

Block Diagram of a Disk Drive System

OTHER PUBLICATIONS

"CD–The Inside Story", by Glen Baddleley, http://werple.net.au/~gnb/mac–cdis/index.html, (Jul. 1, 1998).

"CD–The Inside Story–Part 1– General Principles", by Glenn Baddeley, http://werple.net.au/~gnb/mac–cdis/cd.1.html, (Dec. 2, 1996).

"CD– The Inside Story–Part 2– The Disc", by Glenn Baddeley, http://werple.net.au/~gnb/mac–cdis/cd2.html, (Dec. 2, 1996).

"CD–The Inside Story–Part 3– Data Format", by Glenn Baddeley, http://werple.net.au/~gnb/mac–cdis/cd3.html, pp. 1–2 (Dec. 2, 1996).

"CD–The Inside Story–Part 4– Sub–code", by Glenn Baddeley, http://werple.net.au/~gnb/mac–cdis/cd4.html, pp. 1–2 (Dec. 2, 1996).

"CD–The Inside Story–Part 5– Laser Tracking", by Glenn Baddeley, http://werple.net.au/~gnb/mac–cdis/cd5.html, pp. 1–4 (Dec. 2, 1996).

"CD–The Inside Story–Part 7– Digital to Analog Conversion", by Glenn Baddeley, http://werple.net.au/~gnb/mac–cdis/cd7.html, pp. 1–4 (Dec. 2, 1996)

"DC–The Inside Story–Part 8– Over–sampling and Filtering", by Glenn Baddeley, http://werple.net.au/~gnb/mac–cdis/cd8.html, pp. 1–4 (Dec. 2, 1996).

"CD–The Inside Story–Part 9– Mythology", by Glenn Baddeley, http://werple.net.au/~gnb/mac–cdis/cd9.html, pp. 1–2 (Dec. 2, 1996).

"CD–The Inside Story–Postscript & References", by Glenn Baddeley, http://werple.net.au/~gnb/mac–cdis/cdps.html, pp. 1–2 (Feb. 13, 1998).

"Audio Compact Disk–An Introduction", by Professor Kelin J. Kuhn, http://www.ee.washington.edu/conselec/CE/kuhn/cdaudio/95x6.htm, pp. 1–7 (May 12, 1999).

"Mitsubishi <Control/Driver IC> M56755FP Spindle Motor Driver", pp. 1–9.

"Mitsubishi <Control/Driver IC> M56754SP 4–Channel Actuator Motor Driver", pp. 1–7.

*Runout Calibration for Disc Drive System*, U.S. patent application, Ser. #08/834,607, (Filed Apr. 14, 1997).

\* cited by examiner

Block Diagram of Disk Drive System

Sled Carriage

METHOD AND APPARATUS FOR SEARCHING IN A DISK DRIVE

BRIEF DESCRIPTION OF THE INVENTION

This invention relates generally to disk drive systems. More particularly, this invention relates to a method and apparatus for searching to a target track in a disk drive.

BACKGROUND OF THE INVENTION

Personal computers typically connect to an optical disk drive such as a CD-ROM to read data from a compact disk. On the compact disk, data is stored in the form of pits and lands patterned in a radial track. The track is formed in one spiral line extending from the inner radius of the disk to the outer edge. A pit is a location on the disk where data has been recorded by creating a depression in the surface of the disk with respect to the lands. The lands are the areas between the pits in the tangential direction. The reflectivity of the pits is less than the reflectivity of the lands. To store audio or digital information, the length of the pits and lands are controlled according to a predefined encoding format.

When reading information from the disc, light from a laser beam is directed onto the track and the light beam is reflected back to a photo-sensor. Since the pits and lands have different reflectivity, the amount of reflected light changes at the transitions between the pits and the lands. In other words, the encoded pattern of the pits and lands modulates the reflected light beam. The photo-sensor receives the reflected light beam, and outputs a modulated signal, typically referred to as an RF signal, that is proportional to the energy of the light in the reflected light beam.

In FIG. 1, the relationship of the RF signal to the pits and lands is shown. A smaller pit or land decreases both the period and the amplitude of the RF signal. The RF signal in the pits and lands has opposite polarity.

One encoding format used in optical disk systems is eight-to-fourteen modulation (EFM). EFM reduces errors by minimizing the number of zero-to-one and one-to-zero transitions. In other words, small pits are avoided. In EFM, the data signal includes no less than two zeros and no more than ten zeros between logical transitions at the pit edges. A zero is indicated by no change in the energy reflected beam for at least two clock periods. A one is indicated by a change in the energy of the reflected light beam, that is, a pit edge. Applying the EFM encoding rules, a pit or land will have a length corresponding to the amount of time for at least two and up to ten clock periods and the electronics will output a corresponding voltage as shown in FIG. 1.

In an optical disk drive, an optical head assembly includes the photo-sensor, a tracking actuator and a lens. The optical head assembly is mounted on a sled. The lens is not directly attached to the sled. The lens is mounted on the tracking actuator which is mounted on the sled. The lens is positioned between the photo-sensor and the disk to transmit the light beam from the photo-sensor onto the disk surface and to transmit the reflected light beam to the photo-sensor. The sled and tracking actuator position the lens with respect to the spiral track. The sled is driven by a sled motor that positions the optical head assembly radially across the disk. The tracking actuator is a voice coil motor (VCM) that positions the lens within the limits of the sled. Because the geometry of the photo-sensor is large with respect to a single track, the lens can be positioned within a range of tracks and the photo-sensor can properly detect the RF signal.

A search is performed to position the optical head assembly over a target region of the spiral track. During searching, even though the track is a spiral track, track crossings will be detected as the optical head assembly is moved radially across the spiral track. The track crossings provide relative position information with respect to an initial position on the disk.

For rough searches, the sled and sled motor provide primary positioning of the optical head assembly. For fine searches, the tracking actuator provides primary positioning of the lens in the optical head assembly. An actuator drive signal is used to control the tracking actuator. In some disk drives, a sled motor drive signal is generated by extracting low frequency motion information from the tracking actuator drive signal so that the sled follows the motion of the tracking actuator. This technique works well in normal play mode when the radial motion of the tracking actuator with respect to the spiral track is very slow.

During both play mode and fine search operations, some drives derive the sled motor drive signal from the actuator drive signal, while other drives derive the sled motor drive signal based on the number of tracks to jump. Neither of these methods use track position information. However, these techniques may cause a head crash during a fine search operation because the motion from the tracking actuator is not synchronized to the motion of the sled.

Mechanically, the sled is massive as compared to the tracking actuator. Therefore, the motion of the sled is comparatively slow and has a low frequency response as compared to the tracking actuator. During play mode, the tracking actuator continuously follows the spiral track and the radial motion of the tracking actuator is slow. Therefore, the sled will follow the tracking actuator without many problems.

During fine searches, some disk drives use the track crossing information to control the sled, but the resolution of the track crossing information is too high and too fast for the sled to follow. The track crossing information represents relative movement and not an absolute position. Because of the slow response time of the sled to the track crossing information, the sled may not respond to all track crossings and the position of the sled may become unknown. Therefore, the motion of the sled and the motion of the tracking actuator may become unsynchronized resulting in a head crash.

Some other disk drives derive a sled motor drive signal from the number of tracks to move the head. However, this technique is an estimate of the required sled drive signal that varies with the length of the search and the mechanical characteristics of the disk drive. In addition, this method requires a large gain table based on the number of tracks to move. A long play mode follows each search to correct for any errors in positioning the sled and the tracking actuator, which increases the access time.

In view of the foregoing, it would be highly desirable to provide a method and apparatus to synchronize the tracking actuator and sled during a fine search operation. Such a method and apparatus would provide a more resilient disk drive system by reducing the potential for head crashes. In addition, by synchronizing the motion of the sled and the tracking actuator, the access time for search operations will be reduced.

SUMMARY OF THE INVENTION

A center error signal is used to control the sled during fine search operations. The center error signal is used as a feedback signal to synchronize the motion of the tracking actuator and the sled.

A head that is mounted on a sled in a disk drive is positioned by the method of the invention. The sled is positioned by a sled motor and a lens is positionally mounted on the sled. The lens is positioned with respect to the sled by a tracking actuator. A center error signal indicates a position of the lens with respect to a track on a disk. A tracks-to-jump signal specifies a predetermined number of tracks on the disk that the sled motor is to move. A modified tracks-to-jump signal is produced in response to the center error signal. The sled motor is controlled with the modified tracks-to-jump signal.

In another aspect of the invention, a circuit includes a center error signal generator to generate a center error signal that indicates a position of the lens with respect to a track on a disk. A sled motor signal generator receives a tracks-to-jump signal that specifies a predetermined number of tracks on the disk that the sled motor is to move, produces a modified tracks-to-jump signal in response to the center error signal, and controls the sled motor with the modified tracks-to-jump signal.

In yet another aspect of the invention, a disk drive uses the circuit of the present invention.

According to the principles of the invention the center error signal maintains synchronism between the tracking actuator and sled during the fine search operation. Therefore, the resilience of the disk drive is increased by reducing the potential for head crashes. In addition, by synchronizing the motion of the sled and the tracking actuator, the access time for search operations is reduced.

BRIEF DESCRIPTION OF THE DRAWINGS

For a better understanding of the invention, reference should be made to the following detailed description taken in conjunction with the accompanying drawings, in which.

Like reference numerals refer to corresponding parts throughout the drawings.

DETAILED DESCRIPTION OF THE INVENTION

Figure 1:
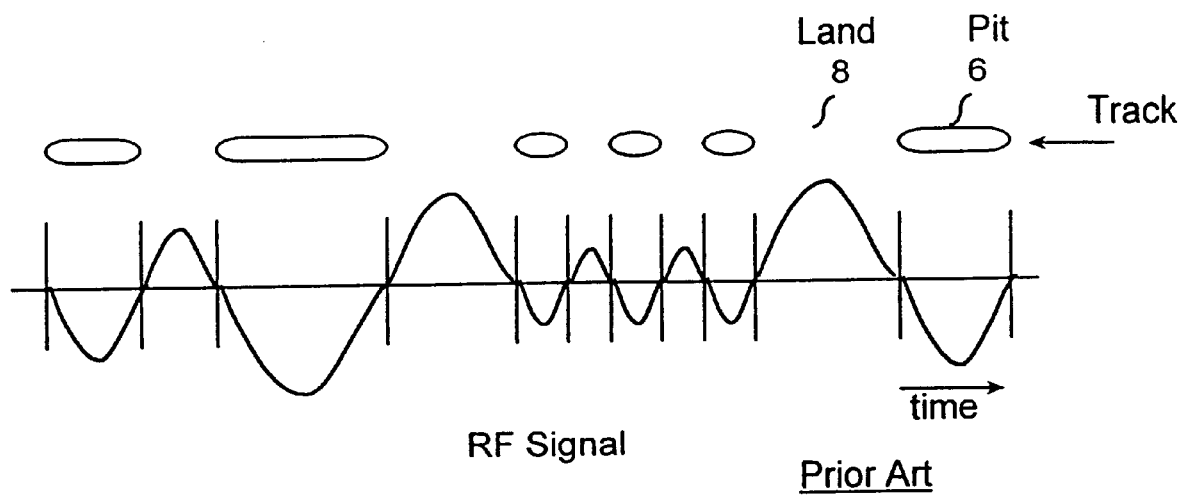
FIG. 1 illustrates the relationship between an analog RF signal and the pits and lands on a disk.
Figure 2:
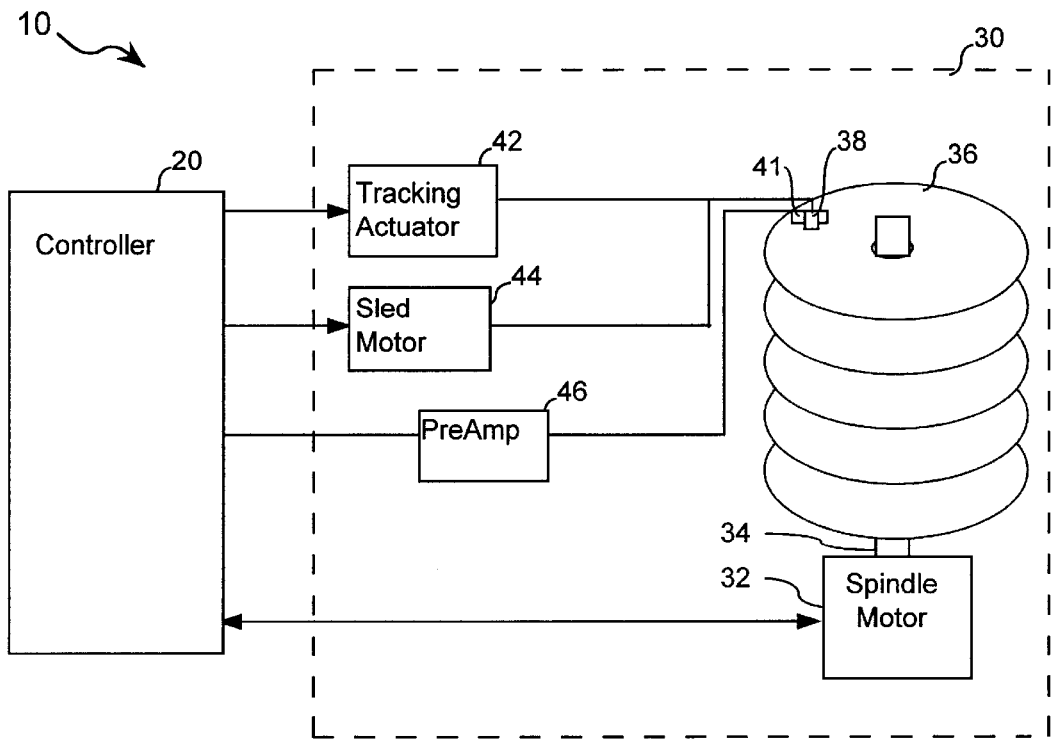
FIG. 2 illustrates a general architecture of a disk drive system in accordance with an embodiment of the present invention.

In FIG. 2, a disk drive system 10 has a controller unit 20 that connects to a disk drive 30 such as an optical disk drive. In the optical disk drive 30, a spindle motor 32 is attached to a spindle 34 which supports at least one disk 36. In response to commands from the controller unit 20, the spindle motor 32 rotates the spindle 34 and therefore the disk 36.

While the disk 36 is rotating, an optical head 38 transmits information from or writes information to the disk 36.

Figure 3:
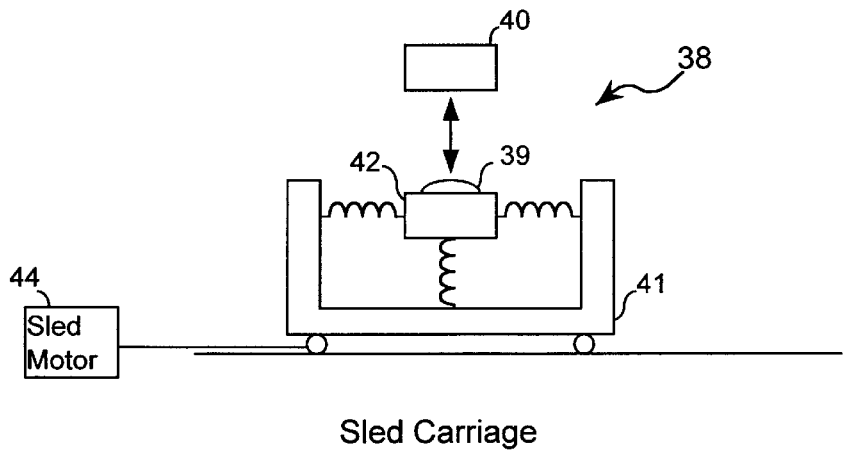
FIG. 3 illustrates a lens mounted in a tracking actuator on a sled of FIG. 2.

Referring also to FIG. 3, the optical head 38 includes a lens 39 and a photo-sensor 40. The lens 39 directs the refected light beam to the photo-sensor 40. The head 38 is mounted on a sled 41. A tracking actuator 42 is coupled to the lens 39 and moves the lens 39 within the confines of the sled 41. The tracking actuator 42 may be a voice coil motor. A sled motor 44 moves the sled 41.

Referring back to FIG. 2, the controller 20 controls the sled 41 and the tracking actuator 42 to position the head 38 and lens 39, respectively, with respect to a target track on the disk 36. On rough searches, the sled motor 44 is the prime mover of the lens 38. On fine searches, the tracking actuator 42 is the prime mover of the lens 39. A rough search is a long search in which the lens 39 position is changed by 300 tracks or more by moving the sled, while a fine search is a short search in which the lens 39 position is changed by less than 300 tracks using the tracking actuator 42.

A preamplifier 46 receives an analog RF signal from the head 38 and outputs an analog read channel signal.

Figure 4:
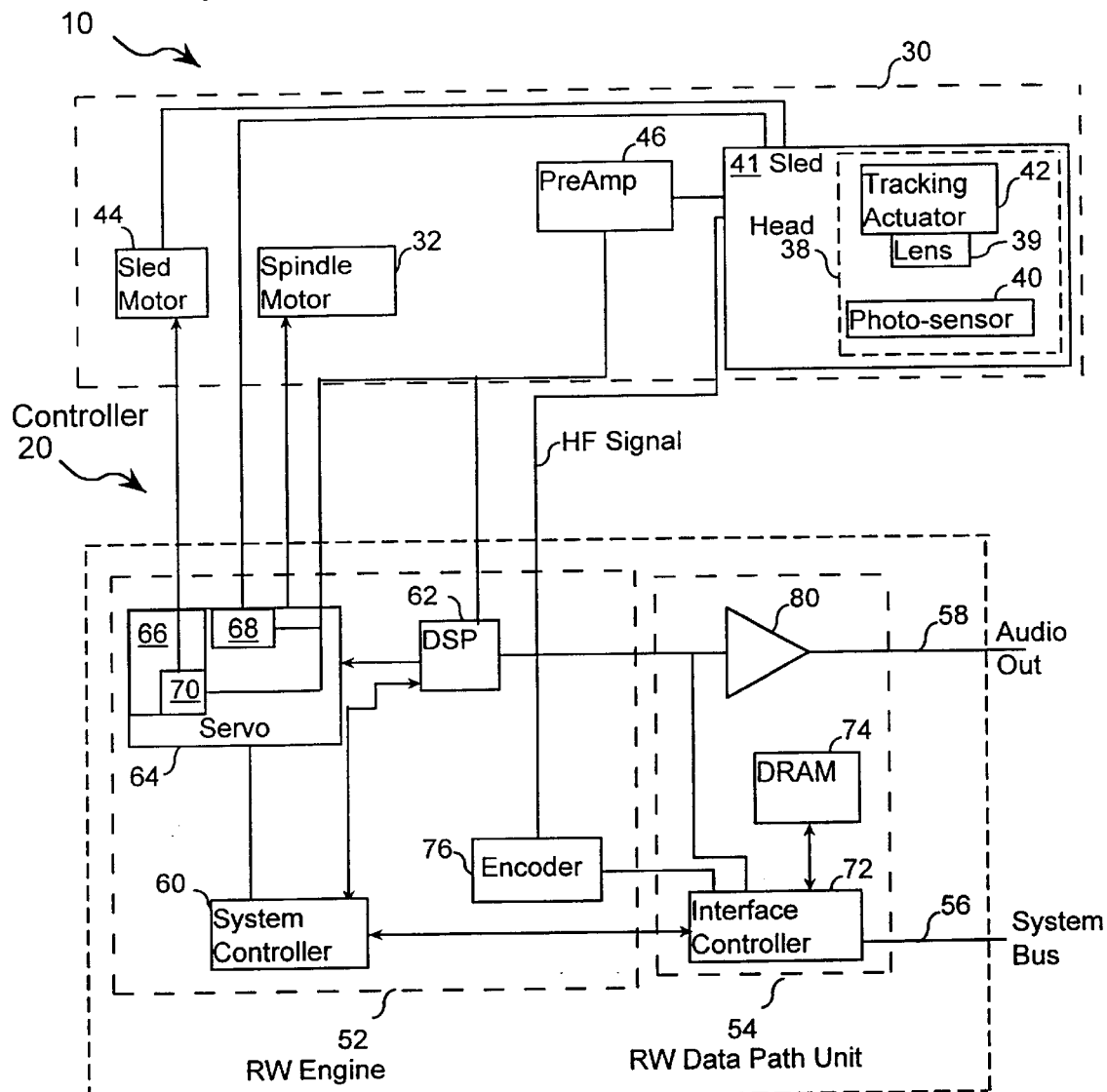
FIG. 4 illustrates a more detailed architecture of a disk controller in accordance with an embodiment of the present invention.

FIG. 4 is a more detailed block diagram of the disk drive system 10 including the disk controller 20 and its associated disk drive 30. The disk controller 20 has a read/write (RW) engine 52 that connects to a read/write (RW) data path unit 54. The RW engine 52 communicates directly with the disk drive 30 while the RW datapath unit 54 communicates with a system bus 56 and supplies an audio signal to an audio output line 58.

The RW engine 52 has a system controller 60, a digital signal processor 62 and a servo control unit 64. The system controller 60 receives commands from and sends status to the system bus 56 via the RW datapath unit 54. In response to the commands from the system bus 56, the system controller 60 sends commands to and receives status information from the digital signal processor (DSP) 62 and the servo control unit 64 to read data from or write data to the disk.

The servo control unit 64 positions the head with respect to a target track, and then keeps the lens 39 centered and focused on the target track based on signals received via the lens 39 and the DSP 62. The servo control unit 64 sends signals to the tracking actuator 42, the sled motor 44 and spindle motor 32 to control tracking, disk rotation and focusing. The servo control unit 64 communicates with the sled motor 44 and the tracking actuator 42 to position the optical head 38 and lens 39 precisely with respect to the spiral track to read the desired information from the disk 36. In particular, in the servo control unit 64, a sled motor driver 66 controls the sled motor 44 with a sled motor drive signal; and, an actuator driver 68 controls the tracking actuator 42 with a actuator drive signal. In the sled motor driver 66, the circuit 70 of the present invention provides the sled motor drive signal during a fine seach mode.

The DSP 62 receives the analog read channel signal from the preamplifier 46. The analog read channel signal includes both digital data and control information. The DSP 62 processes the analog read channel signal and outputs control signals that are used by the servo control unit 64.

To write data to a disk, in the read/write data path unit 54, an interface controller 72 receives the data from the system bus 56, processes the data, and stores the data in the DRAM 74. The interface controller 72 sends the data bytes from the DRAM 74 to an encoder 76 in the RW engine 52. The encoder 76 encodes the data bytes and outputs an EFM signal.

When reading data from the disk, the DSP 62 receives the analog read channel signal and outputs a digital data signal.

The interface controller 72 receives the digital data signal from the DSP 62 in a serial stream, descrambles the data, and assembles the data into eight-bit bytes. The interface controller 72 then stores the data in the DRAM 74. The DRAM 74 acts as a buffer for the digital data from the DSP 62. The interface controller 72 also performs error detection and correction operations on the buffered data and transfers the data to the system bus 56.

To provide an audio output, a digital-to-analog converter (DAC) 80 receives the digital data signal from the DSP 62 and outputs an audio signal on the audio output line 58.

Figure 5:
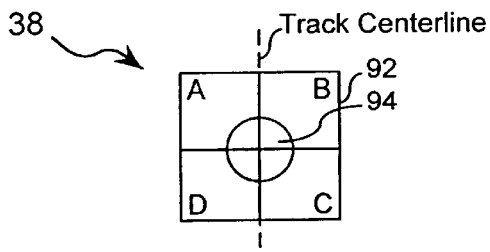
FIG. 5 illustrates the photo-diode mounted on a sled of FIG. 2.

As shown in FIG. 5, on the optical head 38, a photo-diode 92 has four regions, A, B, C and D to receive a main beam of reflected laser light. The main beam is reflected from the disk surface onto the surface of the photo-diode 92 as a spot 94. When the lens 39 (FIG. 3) and therefore the photo-diode 92 are aligned along the centerline of a track, half of the spot 94 will project on regions A and D and half of the spot 94 will project on regions B and C. In other words, regions A and D correspond to one side of the track centerline, while regions B and C correspond to the other side of the track centerline.

Figure 6:
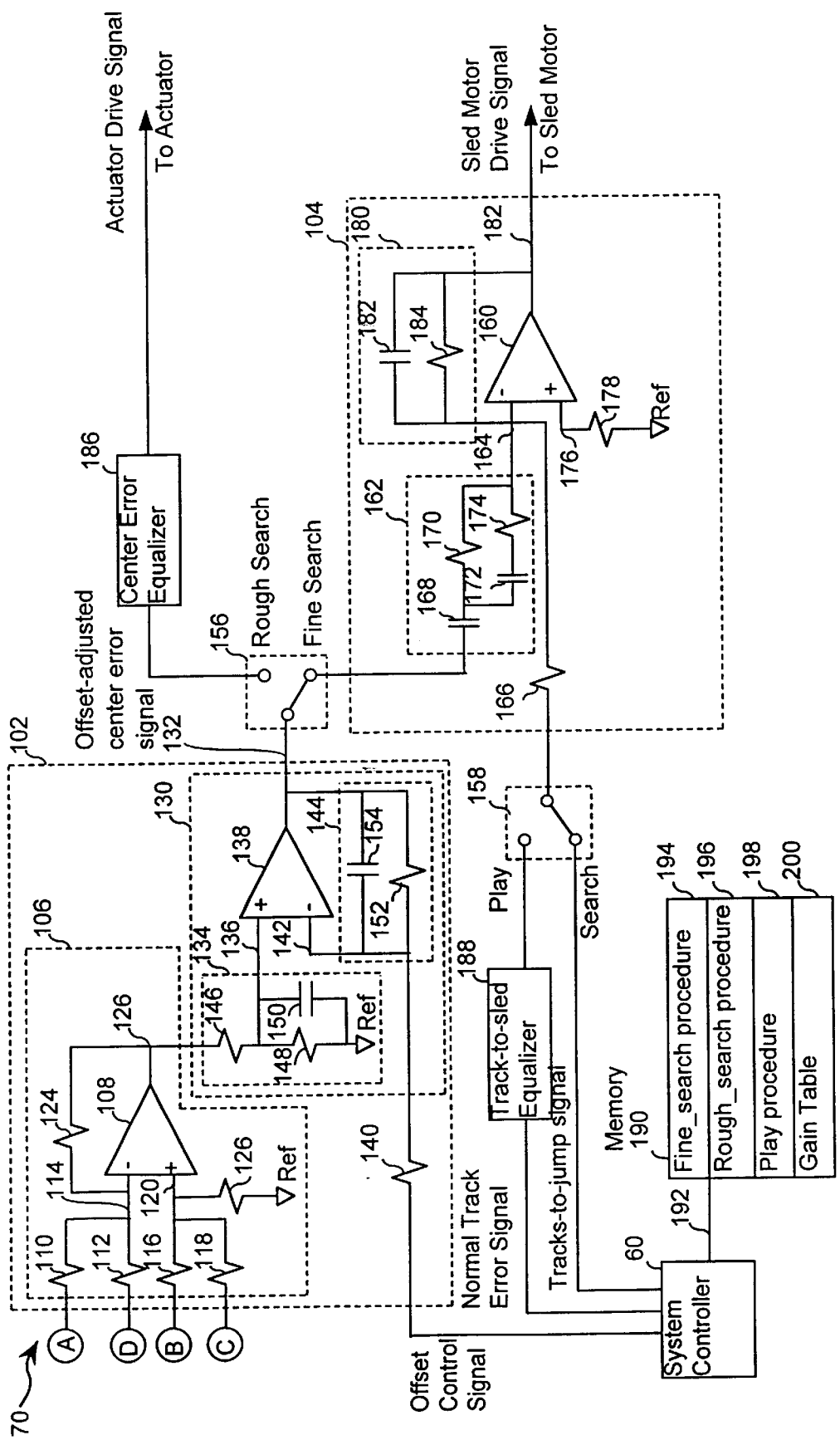
FIG. 6 illustrates a circuit receiving a center error signal and a tracks-to-jump signal that produces a modified tracks-to-jump signal in accordance with an embodiment of the present invention.

In FIG. 6, in a noteworthy aspect of the invention, the circuit 70 uses a center error signal as a feedback signal to control the positioning of the sled motor. A center error signal generator 102 generates the center error signal that indicates the position of the lens with respect to the sled. A sled motor signal generator 104 receives a tracks-to-jump signal that specifies a predetermined number of tracks on the disk that said sled motor is to move. The sled motor signal generator 104 produces a modified tracks-to-jump signal in response to the center error signal, and controls the sled motor with the modified tracks-to-jump signal.

In the center error signal generator 102, in a push-pull block 106, a push-pull differential amplifier 108 generates a push-pull center error signal by combining the voltages from each region of the photo-diode in equation (1) as follows:

$$(B+C)-(A+D) \qquad (1)$$

The push-pull differential amplifier 108 receives voltages corresponding to the portion of the spot projected on each region of the photo-diode, A, B, C and D. The signals from regions A and D are combined via input resistors 110 and 112, respectively, and supplied to a negative input line 114 of the push-pull differential amplifier 108. The signals from regions B and C are combined via input resistors 116 and 118, respectively, and supplied to a positive input line 120 of the push-pull differential amplifier 108. The positive input line 120 is also connected to a reference voltage, in this case ground, via resistor 122. A push-pull feedback resistor 124 provides feedback between the push-pull error signal on a push-pull differential amplifier output line 126 and the negative input line 114.

A center error adjustment block 130 applies an offset adjustment to the push-pull center error signal to produce an offset-adjusted center error signal on line 132. The push-pull center error signal is filtered via an offset filter 134 and is supplied to a positive input line 136 of a center-offset differential amplifier 138. The system controller 60 supplies an offset control signal via an offset-control resistor 140 to the negative input line 142 of the center-offset differential amplifier 138. A center-offset feedback filter 144 provides feedback between the output line 132 of the center-offset differential amplifier 138 and the negative input line 142 of the center-offset differential amplifier 138.

In the offset filter 134, resistor 146 receives the push-pull center error signal and is connected to the positive input line 136 of the center-offset differential amplifier 138. Resistor 148 is connected in parallel to capacitor 150 between the positive input line 136 of the center-offset difference amplifier 138 and a reference voltage, in this case, ground.

In the center-offset feedback filter 144, resistor 152 is connected in parallel with capacitor 154.

The sled motor signal generator 104 receives the offset-adjusted center error signal from the center error signal generator 102 during fine search mode via a rough-fine-search switch 156. The sled motor signal generator 104 receives the tracks-to-jump signal from the system controller 60 during search mode via a play-search switch 158. The system controller 60 controls both the rough-fine-search switch 156 and the play-search switch 158.

In FIG. 6, the rough-fine-search switch 156 and the play-search switch 158 are positioned for fine search mode. The system controller 60 uses fine search mode when the number of tracks over which to move the head is less than a predetermined jump threshold. The predetermined jump threshold is a function of the range of motion of the voice coil motor on the sled and the pitch of the spiral track. In one implementation, the system controller 60 sets fine search mode when the number of tracks to jump is less than three hundred tracks.

The sled motor signal generator 104 supplies the sled motor drive signal to the sled motor to control the movement and position of the sled motor. In another noteworthy aspect of the invention, during fine search mode, the sled motor signal generator 104 conditions the offset-adjusted center error signal and uses the offset-adjusted center error signal as a position feedback signal to drive the sled motor.

In the sled motor signal generator 104, a sled-motor-generator differential amplifier 160 receives a filtered offset-adjusted center error signal from the center error signal generator 102 via a sled-motor-generator lead-lag filter 162 at a negative input line 164. During search mode, the system controller 60 supplies the tracks-to-jump signal to the sled motor signal generator 104. The tracks-to-jump signal is a gain based on the number of tracks to jump. The system controller 60 determines the number of tracks over which to move the head, accesses a gain table 200 associating the number of tracks with a predetermined gain, and outputs the predetermined gain as the tracks-to-jump signal. The tracks-to-jump signal is supplied to the negative input line 164 of the sled-motor-generator differential amplifier 160 via a sled-motor-generator input resistor 166.

In the sled-motor-generator lead-lag filter 162, capacitor 168 receives the offset-adjusted center error signal from the center error signal generator 102. Capacitor 168 is connected in series with resistor 170 which is connected to the negative input line 164 of the sled-motor-generator differential amplifier 160. Another capacitor 172 and resistor 174 are connected in series. The series connected capacitor 172 and resistor 174 are connected in parallel to resistor 170. In an alternate embodiment of the invention, the capacitor 168 is not used.

A positive input line 176 of the sled-motor-generator differential amplifier 160 is coupled to a reference voltage, in this case ground, via a sled-motor-generator-differential-amplifier resistor 178.

A sled-motor-generator feedback filter 180 is a low pass filter that provides feedback between the output line 182 of the sled-motor-generator differential amplifier 160 and the negative input line 164 of the sled-motor-generator differential amplifier 160. The sled-motor-generator feedback filter 180 is a low-pass filter with capacitor 182 connected in parallel to resistor 184. The values of resistors 170, 174 and 184 define the gain of the a sled-motor-generator differential amplifier 160.

In this way, by filtering and using the offset-adjusted center error signal as a position feedback signal to drive the sled motor during fine search mode, the present invention synchronizes the motion of the tracking actuator to the sled. Therefore, the probability of a head crash is reduced. In addition, by synchronizing the motion of the tracking actuator to the sled, the length of a post search play may be reduced thereby reducing the access time of the disk drive.

During rough search mode, the switch 156 supplies the offset-adjusted center error signal to the tracking actuator via the center error equalizer 186 and does not adjust the sled motor drive signal with the offset-adjusted center error signal. During rough search mode, the offset-adjusted center error signal is used to position the head, via the tracking actuator, at the center of the sled. The offset-adjusted center error signal indicates the relative position of the tracking actuator and head within the confines of the sled. In one embodiment, the range of motion of the tracking actuator within the sled is ±0.4 millimeter which is equivalent to approximately ±540 tracks on a DVD disk.

During play mode, the system controller 60 supplies a normal track error signal to the sled motor signal generator 104 via the track to sled equalizer 188 and the play-search switch 158. In play mode, when following the spiral track, the radial motion of the tracking actuator and head is very slow. Because of the slow radial motion, the sled follows the head easily and the motion of the tracking actuator and sled remain synchronized.

A system controller 60 is coupled to a memory 190 via a system bus 192. The memory 192 stores a Fine_search procedure 194, a Rough_search procedure 196, a Play procedure 198 and a Gain Table 200. These procedures configure the rough-fine-search switch 156 and the play-search switch 158 to supply the proper signals for the various operations. The Rough_search procedure 196 sets the rough-fine-search switch 156 to rough search and the play-search switch 158 to search during rough search mode. The Play procedure 198 sets the rough-fine-search switch 156 to fine search and the play-search switch 158 to play during play mode.

For fine search mode, the Fine_search procedure 194 sets the rough-fine-search switch 156 to fine search and the play-search switch 158 to search. The Fine_search procedure 194 determines the number of tracks over which to move the head, accesses the gain table 200 to determine the gain based on the number of tracks, and outputs the gain as the tracks-to-jump signal.

Using the invention, the size of the gain table can be reduced. In one prior art implementation, a different gain was set based on the number of tracks to jump in increments of thirty-two tracks. Using the present invention, a different gain was set in increments of fifty tracks. In this way, the invention reduced the size of the gain table and used memory more efficiently.

Table 1 below shows an implementation using a set of preferred values for the various components of FIG. 6.

TABLE 1

| Set of Preferred Component Values | |
|---|---|
| Component | Value |
| 110 | 10 KΩ |
| 112 | 10 KΩ |
| 116 | 10 KΩ |
| 118 | 10 KΩ |
| 124 | 51 KΩ |

TABLE 1-continued

| Set of Preferred Component Values | |
|---|---|
| Component | Value |
| 126 | 51 KΩ |
| 146 | 20 KΩ |
| 148 | 20 KΩ |
| 152 | 20 KΩ |
| 140 | 20 KΩ |
| 150 | 0.0018 μf |
| 154 | 0.0018 μf |
| 168 | 10.0 μf |
| 170 | 195 KΩ |
| 172 | 1.0 μf |
| 174 | 5 KΩ |
| 178 | 22 KΩ |
| 184 | 20 KΩ |
| 182 | 0.047 μf |

In an alternate embodiment, the sled motor signal generator is implemented digitally with a digital signal processor. An analog-to-digital converter converts the analog offset-adjusted center error signal to a digital offset-adjusted center error signal. The digital signal processor receives the digital offset-adjusted center error signal from the analog-to-digital converter, receives the digital tracks-to-jump signal from the system controller and generates the digital sled motor drive signal. A digital-to-analog converter converts the digital sled motor drive signal to an analog sled motor drive signal for output to the sled motor driver.

In this way, the invention adjusts the sled motor drive signal with the center error signal during fine search mode to synchronize the motion of the tracking actuator with the sled motor. Therefore, the possibility of a head crash is reduced and the access time of a fine search operation is also reduced.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following Claims and their equivalents.

What is claimed is:

1. A circuit for positioning a head mounted on a sled in a disk drive, said sled being positioned by a sled motor, a lens mounted on said sled, said lens being positioned with respect to said sled by a tracking actuator, said lens directing a reflected light beam from a disk to a photo-sensor on said head, said circuit comprising:

a center error signal generator to generate an analog center error signal that indicates a position of said head with respect to a track on a disk; wherein the analog center error signal output of the center error generator is coupled to the tracking actuator so as to control positioning of said lens with respect to said sled in accordance with the analog center error signal; and a sled motor signal generator to receive an analog tracks-to-jump signal corresponding to a specified number of tracks on said disk that said sled is to move, said sled motor signal generator including an analog circuit configured to combine said analog center error signal and said analog tracks-to-jump signal to produce a modified tracks-to-jump signal, and circuitry to control said sled motor with said modified tracks-to-jump signal.

2. The circuit of claim 1 wherein said sled motor signal generator modifies said tracks-to-jump signal when said specified number of tracks is less than a first threshold.

3. The circuit of claim 1 wherein said center error signal generator adjusts said center error signal with an offset signal.

4. A circuit for positioning a head mounted on a sled in a disk drive, said sled being positioned by a sled motor, a lens mounted on said sled, said lens being positioned with respect to said sled by a tracking actuator, said lens directing a reflected light beam from a disk to a photo-sensor on said head, said circuit comprising:

a center error signal generator to generate a center error signal that indicates a position of said head with respect to a track on a disk; and a sled motor signal generator to receive an analog tracks-to-jump signal corresponding to a specified number of tracks on said disk that said sled motor is to move, said sled motor signal generator including an analog circuit configured to produce a modified tracks-to-jump signal in response to said center error signal and said tracks-to-jump signal, and circuitry to control said sled motor with said modified tracks-to-jump signal;

wherein said sled motor signal generator further includes:
an input filter to filter said center error signal for input to a differential amplifier; and
a feedback filter to provide a feedback signal between said differential amplifier output and said differential amplifier input.

5. The circuit of claim 4 wherein said input filter is a lead-lag filter and said feedback filter is a lag-lead filter.

6. The circuit of claim 4 wherein said input filter includes:
a first capacitor to receive said center error signal, connected in series with a first resistor; and
a second capacitor connected in series with a second resistor, wherein said first resistor is connected in parallel with said series connected second capacitor and second resistor, said second resistor being connected to a negative input of said differential amplifier.

7. The circuit of claim 4 wherein said feedback filter includes:
a feedback resistor connected in parallel with a feedback capacitor.

8. A disk drive comprising:
a spindle motor rotating a disk having a spiral track;
a head having a photo-sensor and a lens, said lens directing a reflected light beam from said disk to said photo-sensor;
a movable sled supporting said head;
a sled motor, responsive to a sled motor signal, to position said head with respect to said spiral track;
a center error signal generator to generate a center error signal that indicates a position of said lens with respect to said spiral track on said disk;

a tracking actuator coupled to said lens and said sled to position said lens with respect to said sled and with respect to said spiral track in response to said center error signal; and a sled motor signal generator circuit configured to combine said center error signal with a jump signal, corresponding to a specified number of tracks on said disk that said sled is to move, so as to generate said sled motor signal to cause said sled motor to move said sled over said specified number of tracks on said disk.

9. The circuit of claim 8 wherein said sled motor signal generator modifies said gain when said predetermined number of tracks is less than a first threshold.

10. The circuit of claim 8 wherein said center error signal generator adjusts said center error signal by combining the center error signal with an offset signal.

11. A disk drive comprising:
a spindle motor rotating a disk having a spiral track;
a head having a photo-sensor and a lens, said lens directing a reflected light beam from said disk to said photo-sensor;
a movable sled supporting said head;
a sled motor, responsive to a sled motor signal, to position said head with respect to said spiral track;
a tracking actuator coupled to said lens to position said lens with respect to said spiral track, said tracking actuator being mounted on said sled;
a center error signal generator to generate a center error signal that indicates a position of said lens with respect to said spiral track on said disk; and
a sled motor signal generator to generate said sled motor signal to cause said sled motor to move said sled over a specified number of tracks on said disk by modifying an analog gain based on a number of tracks to jump signal using said center error signal;
wherein
said sled motor signal generator is configured to modify said gain when said predetermined number of tracks is less than a first threshold; and
said sled motor signal generator includes a differential amplifier to subtract said center error signal from said gain to generate said sled motor signal.

12. The circuit of claim 11 wherein said sled motor signal generator further includes:
an input filter to filter said center error signal for input to said differential amplifier; and
a feedback filter to provide a feedback signal between said differential amplifier output and said differential amplifier input.

13. The circuit of claim 12 wherein said input filter is a lead-lag filter and said feedback filter is a lag-lead filter.

14. The circuit of claim 12 wherein said input filter includes:
a first capacitor to receive said center error signal, connected in series with a first resistor; and
a second capacitor connected in series with a second resistor, wherein said first resistor is connected in parallel with said series connected second capacitor and second resistor, said second resistor being connected to a negative input of said differential amplifier.

15. A method of positioning a head mounted on a sled in a disk drive, said sled being positioned by a sled motor, a lens mounted on said sled, said lens being positioned with respect to said sled by a tracking actuator, said lens directing a reflected light beam from a disk to a photo-sensor on said head, said method comprising:

generating an analog center error signal that indicates a position of said head with respect to a track on a disk;

controlling the tracking actuator with said center error signal so as to control positioning of said lens with respect to said sled;

receiving an analog tracks-to-jump signal corresponding to a specified number of tracks on said disk that said sled is to move;

combining the analog center error signal and the analog track-to-jump signal to produce a modified tracks-to-jump signal; and controlling said sled motor with said modified tracks-to-jump signal.

16. The method of claim 15 wherein said modified tracks-to-jump signal is produced in response to said center error signal when said specified number of tracks is less than a first threshold.

17. The method of claim 15 further comprising:

adjusting said center error signal by combining said center error signal with an offset signal.

18. The method of claim 15 wherein said producing is performed during a fine search mode.

19. The method of claim 18 wherein said fine search mode is when said specified number of tracks is less than a first threshold.

20. A disk drive comprising:

a spindle motor rotating a disk having a spiral track;

a head having a photo-sensor and a lens, said lens directing a reflected light beam from said disk to said photo-sensor;

a movable sled supporting said head;

a sled motor, responsive to a sled motor signal, to position said head with respect to said spiral track;

a tracking actuator coupled to said lens to position said lens with respect to said spiral track, said tracking actuator being mounted on said sled;

a center error signal generator to generate a center error signal that indicates a position of said lens with respect to said spiral track on said disk; and a sled motor signal generator to generate said sled motor signal to cause said sled motor to move said sled over a specified number of tracks on said disk by modifying an analog gain based on a number of tracks to jump signal using said center error signal;

said sled motor signal generator including circuitry to modify said gain, when said predetermined number of tracks is less than a first threshold, by combining said gain with said center error signal so as to generate said sled motor signal.

* * * * *